Figure 4:
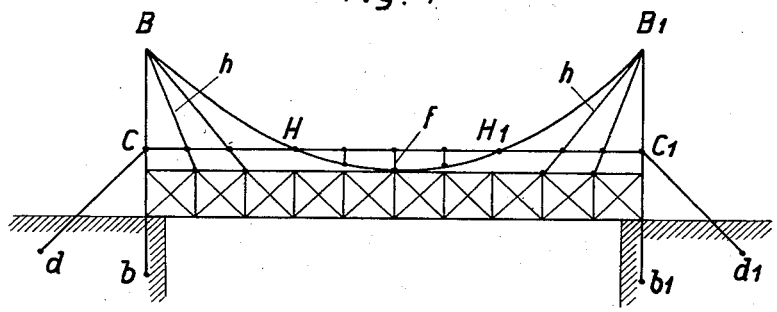

Dec. 1, 1936.          L. U. E. A. BATICLE                 2,062,984
                         SUSPENSION BRIDGE
                        Filed April 5, 1934              3 Sheets-Sheet 1
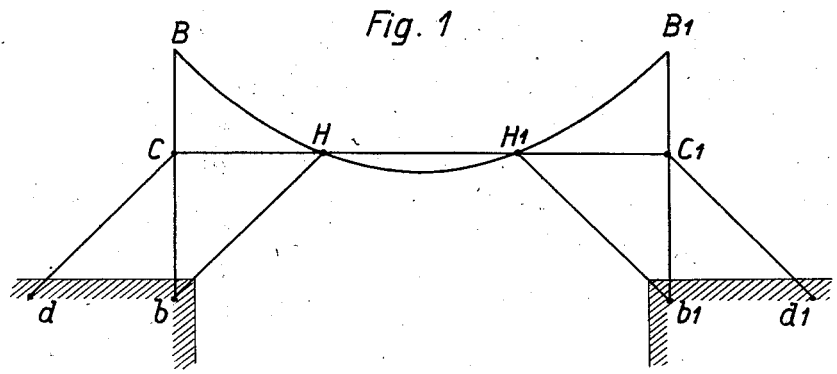
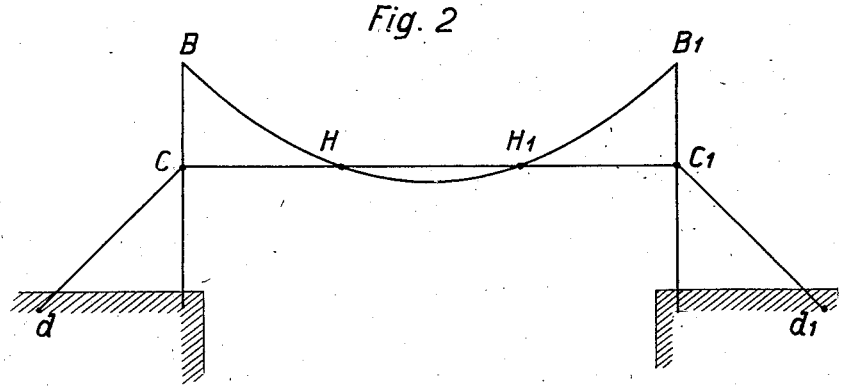
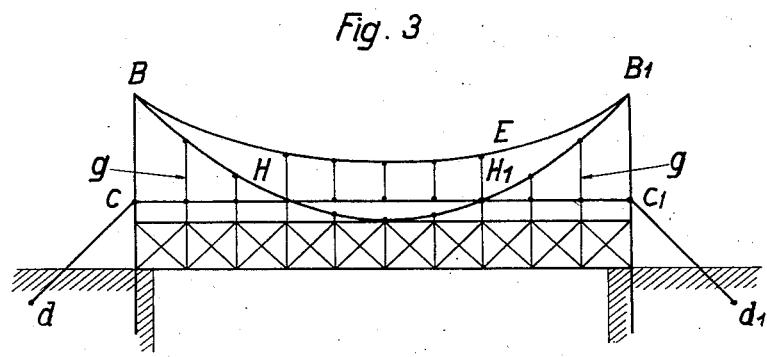
Louis U. E. A. Baticle, Inventor Dec. 1, 1936.  L. U. E. A. BATICLE  2,062,984
SUSPENSION BRIDGE
Filed April 5, 1934   3 Sheets-Sheet 3

Patented Dec. 1, 1936

2,062,984

UNITED STATES PATENT OFFICE 2,062,984

SUSPENSION BRIDGE

Louis Urbain Edgar Antonin Baticle, Paris, France

Application April 5, 1934, Serial No. 719,090
In France April 5, 1933

2 Claims. (Cl. 14—18)

This invention relates to suspension bridges and is an improvement in or modification of the invention claimed in my prior application Ser. No. 547,943.

The said prior application is concerned with an arrangement for anchoring the extreme third portions of the parabolic supporting cables of suspension bridges, such that the anchored parts constitute with the anchors triangulated indeformable frameworks. The said anchors serve the purpose of rigid struts due to the fact that they receive an initial tension sufficient to remain always stretched under the influence of the most unfavourable overloads. The arrangements designed according to this principle are particularly suitable for bridges, the platforms of which are heavy, because the section of the anchors, which is a function of the amounts of the overloads, reaches satisfactory values and that the initial tension of its anchors does not reduce considerably the flexure of the central part. On the contrary and for the same reasons they lead to onerous solutions in transporter bridges, for example, the platforms of which are relatively light and which are subjected to very heavy overloads.

The arrangement forming the subject of the present invention is particularly suitable to this type of bridge and in general to all works suspended by parabolic supporting cables and subjected to heavy overloads compared with the permanent loads. This arrangement consists in connecting by anchors the points of the carrying cables which it is desired to render fixed to fixed parts of the adjacent pillars and to connect the said points together by a cable, this latter and the said anchors presenting practically no flexure. The arrangement in question presents the advantage of not requiring any initial tension of the anchors and of the cable employed, apart of course from the tension required to be applied to them to reduce their flexure within convenient limits.

This arrangement is a development of that indicated in my said prior application having a single anchorage with initial tension per pillar and according to which the fixed position in space of the points of attachment of the two anchors employed is ensured by means of a horizontal cable stretched between the two pillars at the level of the points of attachment of the said anchors.

As an example, and for purposes of illustration, several embodiments of the invention are shown in the attached drawings wherein similar reference characters represent corresponding members throughout.

Figure 5:
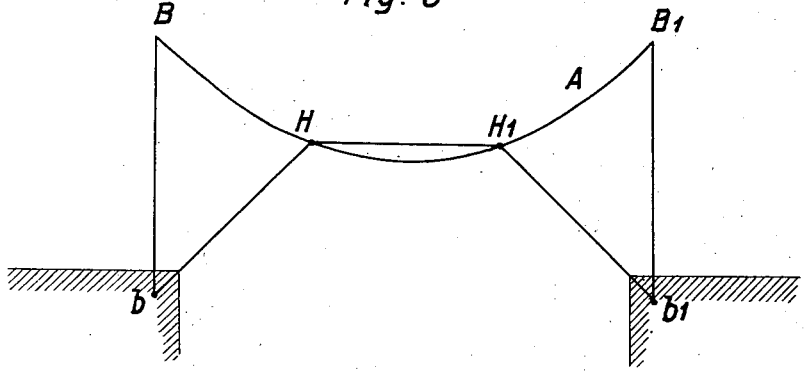
Figure 6:
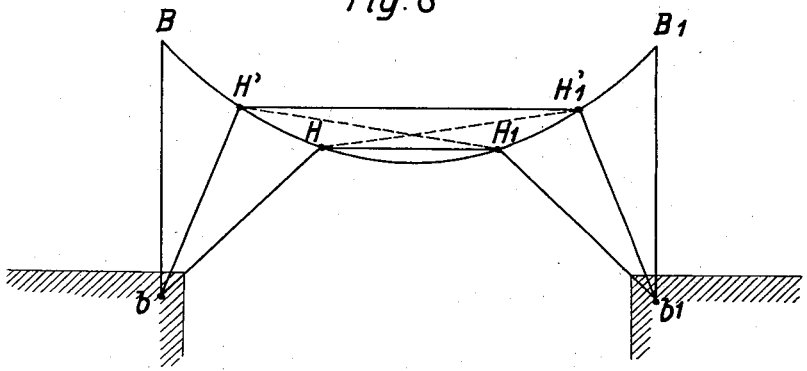
Figure 7:
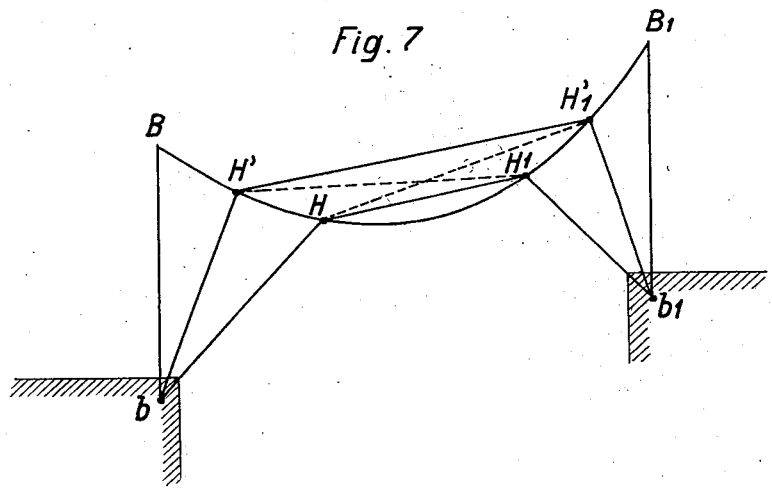
Figure 8:
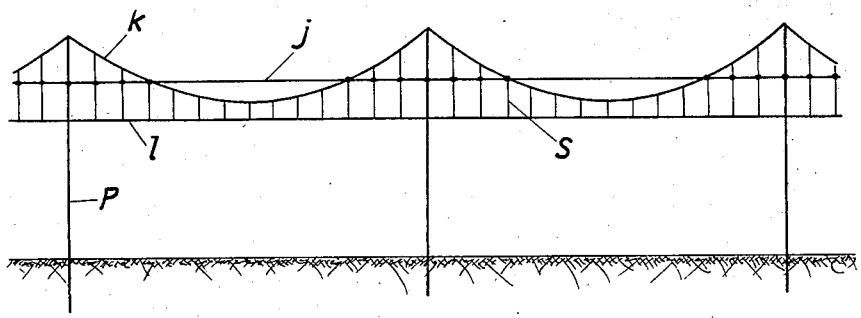

In these drawings:

Figure 1 represents diagrammatically a bridge suspension having tensioning anchors, Figure 2 shows the arrangement resulting from the elimination of said anchors, Figure 3 shows a suspension bridge to which has been applied the teaching of Figure 2, with overhead means for securing the horizontal cable, Figure 4 is a similar view wherein rigid struts are employed to prevent deformation of horizontal cable, Figure 5 represents diagrammatically a modification in the arrangement of the horizontal cable, Figure 6 is a view similar to Figure 5 wherein several points of the supporting cable are provided with anchors, Figure 7 is a similar view but with the supporting piers at different levels, and Figure 8 is an application of the invention to catenary suspensions for electric traction lines.

In Figure 1, which has been disclosed in my corresponding application 547,943, although it is a modification of Figure 1 of that application, the cable CHH'C' operates as follows: whenever the left of the bridge is loaded, this point thereof tends to fall and come nearer the support $Bb$. Therefore, the portion HH'C' of the cable CHH'C' counteracts this tendency by the tension it exerts on the point H which is thus fixedly secured.

It will be noted that the points HH' of the cable are fixedly held because the cable CHH'C', assumed to be horizontal, connects said points each to an adjoining pillar which is also stationary. This connection may be had by tying each of points HH' to any stationary part of adjacent pillars and by joining these points together with a cable, all said cables having no sag. Furthermore, tensioned anchors $bH$, $b'H'$ are shown connecting points H and H' to the base of the pillars.

Fig. 2 shows the arrangement which is best suited to a transporter bridge, an arrangement resulting from dispensing with the anchors $bH$, $b_1H_1$. The points H and $H_1$ of supporting cable $BHH_1B_1$ are here secured solely to a horizontal cable $CHH_1C_1$ fixed at C and $C_1$ to the bridge piers and anchored to points $d$ and $d_1$ of the shore. The horizontal cable will then be of a section sufficient to resist forces acting to move the points H and $H_1$ towards the supports on the passage of movable overloads and sufficiently stretched so as to present only a relatively slight flexure.

In large spans the horizontal condition of the cable $CHH_1C_1$ will be ensured by known means. For this purpose the central part $HH_1$ can be suspended from a supporting cable E (Fig. 3), or supported by struts $f$ (Fig. 4) attached to the supporting cable. For the lateral parts it is sufficient to connect them to slings $g$ (Fig. 3) or to supporting anchors $h$ (Fig. 4) of the platform of the bridge.

The operation of the cable $CHH_1C_1$ at the points $HH_1$ does not change when its form departs from the straight line and its position from the horizontal. In certain cases the arrangement shown in Fig. 5 may be adopted where the points H and $H_1$ of the supporting cable A are connected together by a horizontal portion of the cable and each connected moreover to the pillars by symmetrical inclined portions $bH$ and $b_1H_1$ of the same cable. It is obvious that the cables $bH, HH_1$ and $H_1b_1$ may be separate without affecting the operation of the arrangement.

Several points of the extreme portions of the supporting cables may be anchored in the manner described as is shown in Fig. 6. The points H, H', $H_1$, $H'_1$ may be connected together either by horizontal cables $HH_1$, $H'H'_1$ or by inclined cables $HH'_1$, $H'H_1$. The same arrangements apply to bridges the pillars of which are not at the same level (Fig. 7). In this instance the cables $HH_1$ and $H'H'_1$ are inclined which does not affect the operation of the arrangement. It is sufficient in fact that each point of the supporting cable to be held fixed should be connected on the one hand to a fixed point located on the side of the adjacent pillar and on the other hand to a similar point of the supporting cable to be fixedly located on the side of the other pillar and connected in similar manner to the latter. It is not necessary that the parts adjacent the pillars rendered rigid by the system of cables and anchors described should be equal to the third portions of the total span. The arrangement suggested for transporter bridges (Fig. 2) is applicable to catenary suspensions of electric traction lines (Fig. 8). The supporting cables $k$ of the line $l$ are anchored by horizontal cables $j$ fixed to the pylons P and attached to slings $s$ which cross them.

It would be advantageous to use in order to form the cables $j$ the feeders themselves which supply the line. The latter will be for this purpose moored to supporting pylons suitably selected and capable of resisting the horizontal forces opposing the displacement of the points of the supporting cables to be rendered fixed.

Having now particularly described and ascertained the nature of my said invention and in what manner the same is to be performed, I declare that what I claim is:

1. In a catenary suspension having a parabolic cable secured to and between supporting towers, an auxiliary cable intersecting the parabolic cable and joined thereto at the points of intersection, said auxiliary cable being under tension to minimize sag, and a cable connecting each of said points of intersection to an adjacent tower at a location on the tower not higher than one established on the tower by a straight line passing through said points of intersection, said connecting cables and the parabolic cable being the sole cables extending between the points of intersection and the adjacent towers.

2. In a catenary suspension having a parabolic suspension cable secured to suitable towers, a horizontal tensioning cable secured to said towers and intersecting the supporting cable at points thereof to be rendered fixed, said horizontal cable being attached to said points and under tension to reduce its flexure.

LOUIS URBAIN EDGAR ANTONIN BATICLE.